(12) United States Patent
Park (10) Patent No.: US 8,473,107 B2
(45) Date of Patent: Jun. 25, 2013

(54) OFFERED ACTIONS FOR ENERGY MANAGEMENT BASED ON ANOMALOUS CONDITIONS

(75) Inventor: Daniel J. Park, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 246 days.

(21) Appl. No.: 12/850,833

(22) Filed: Aug. 5, 2010

(65) Prior Publication Data
US 2012/0035777 A1 Feb. 9, 2012

(51) Int. Cl.
*G06F 19/00* (2011.01)
(52) U.S. Cl.
USPC .......................... 700/276; 340/12.37; 379/38
(58) Field of Classification Search
USPC ............ 700/276, 286, 291; 340/12.37, 573.4; 701/18; 379/38; 705/412
See application file for complete search history.

(56) References Cited

U.S. PATENT DOCUMENTS

| | | | | |
|---|---|---|---|---|
| 4,657,179 A | * | 4/1987 | Aggers et al. ................... | 236/51 |
| 4,808,841 A | * | 2/1989 | Ito et al. ............................ | 307/11 |
| 5,157,273 A | * | 10/1992 | Medendorp et al. ........... | 307/147 |
| 5,487,002 A | * | 1/1996 | Diller et al. ........................ | 701/1 |
| 5,692,215 A | * | 11/1997 | Kutzik et al. .................... | 710/18 |
| 6,642,843 B2 | | 11/2003 | Satoh ............................. | 340/509 |
| 6,748,299 B1 | * | 6/2004 | Motoyama ..................... | 700/286 |
| 6,785,592 B1 | * | 8/2004 | Smith et al. .................... | 700/291 |
| 6,816,811 B2 | * | 11/2004 | Seem ............................. | 702/179 |
| 6,968,295 B1 | | 11/2005 | Carr | |
| 6,993,417 B2 | | 1/2006 | Osann, Jr. | |
| 7,062,389 B2 | * | 6/2006 | Johnson et al. .................. | 702/61 |
| 7,565,227 B2 | | 7/2009 | Richard et al. | |
| 7,671,735 B2 | * | 3/2010 | Karaoguz et al. ........ | 340/539.14 |
| 7,962,536 B2 | * | 6/2011 | Culp et al. ..................... | 700/291 |
| 7,963,454 B2 | * | 6/2011 | Sullivan et al. ................. | 236/51 |
| 8,049,592 B2 | * | 11/2011 | Wang et al. ..................... | 340/3.1 |
| 2003/0058095 A1 | * | 3/2003 | Satoh ............................ | 340/509 |
| 2003/0076109 A1 | * | 4/2003 | Verbrugge et al. ............ | 324/427 |
| 2004/0095237 A1 | * | 5/2004 | Chen et al. ..................... | 340/506 |
| 2004/0128266 A1 | | 7/2004 | Yellepeddy et al. | |
| 2004/0225649 A1 | * | 11/2004 | Yeo et al. .......................... | 707/3 |
| 2005/0192713 A1 | * | 9/2005 | Weik et al. ..................... | 700/295 |
| 2007/0203860 A1 | | 8/2007 | Golden et al. | |
| 2007/0239317 A1 | * | 10/2007 | Bogolea et al. ............... | 700/276 |
| 2008/0177678 A1 | * | 7/2008 | Di Martini et al. ........... | 705/412 |

FOREIGN PATENT DOCUMENTS

| | | |
|---|---|---|
| JP | 2002-142384 | 5/2002 |
| JP | 2011-159051 | 8/2011 |
| WO | WO 2011/080986 A1 | 7/2011 |
| WO | WO2011/093277 A1 | 8/2011 |

OTHER PUBLICATIONS

Chao et al., A profile Base Energy Management System for Domestic Electrical Appliances, 2007, Dept.f computer and Digital Enviroment Coventry Univ., 1-6.*
Smith,Long,Lung,Anwar,and Subramanian,"PaperSpace:A System for Managing Digital and Paper Documents",CHI 2006.ACM 1-59593-298-4/06/0004, Apr. 22-27, 2006. Canada.
International Search Report for Serial No. PCT/JP2011/068332 mailed Aug. 11, 2011.

\* cited by examiner

*Primary Examiner* — Kidest Bahta
(74) *Attorney, Agent, or Firm* — Brooks Acordia IP Law, PC; Pejman Yedidsion; David Ripma (57) ABSTRACT

Systems and devices for, and methods of, energy management via prompted response options based on detected anomalous conditions.

24 Claims, 8 Drawing Sheets

OFFERED ACTIONS FOR ENERGY MANAGEMENT BASED ON ANOMALOUS CONDITIONS

TECHNICAL FIELD

Embodiments pertain to systems and devices for, and methods of, energy management via prompted response options based on detected anomalous conditions.

BACKGROUND

Energy consuming devices such as regulated devices including air conditioners, freezers, air handling systems and water heaters vary their respective levels of consumption due to seasonal variations but the levels of consumption may also be affected by unusual or out of the norm conditions. Residential solar panels and wind-based electrical power generating systems generate energy and site energy storage devices generate energy and store energy respectively due to seasonal variations, but the levels of energy production and storage may also be affected by unusual or out of the norm conditions.

SUMMARY

Embodiments include methods, systems, and devices where, for example a method embodiment of energy management at a site may include the steps of: (a) associating, by a computing device, a detected anomalous energy state occurrence with a set of one or more contextual attributes of the site; and (b) providing, based on the set of one or more contextual attributes, a set of proposed responses per each member of a set of proposed causal situations. Optionally, the anomalous energy state is at least one of: anomalous energy consumption and anomalous energy production. Method embodiments may further comprise: revising the set of proposed causal situations based on an input designation of a proposed response.

Some embodiments may include the step of providing, based on the set of one or more contextual attributes, the set of proposed responses per each member of the set of proposed causal situations via a user interface for input designation. Method embodiments may further comprise: revising the set of proposed responses of at least one member of the set of proposed causal situations based on an input designation of a proposed response. In some embodiments the set of proposed causal situations may be provided in a ranked order based on likelihood estimates per each member of the set of proposed causal situations. Some embodiments may include the step of: applying a weighting factor to at least one member of the set of proposed causal situations, and where the set of proposed causal situations is provided in a ranked order based on weighted likelihood estimates. Optionally, the weighting factor is based on a frequency of input designation of a proposed response. Some embodiments may further include the step of: applying a weighting factor to at least one member of the set of proposed responses, and where the set of proposed responses is provided in a ranked order based on numerical weight. Optionally, the weighting factor is based on a frequency of input designation of a proposed response. In other embodiments, a detected anomalous energy consumption occurrence is based on a comparison of estimated energy consumption and expected energy consumption based on the set of one or more contextual attributes of the site. Optionally, the set of one or more contextual attributes are derived from a simulated diurnal-seasonal model of the site.

Embodiments pertain to devices for energy management at a site, and the device embodiment may comprise: (a) a processor, and (b) an addressable memory, where the addressable memory comprises a set of one or more contextual attributes of the site, and where the processor is configured to: (a) associate a detected anomalous energy state occurrence with the set of one or more contextual attributes of the site, and (b) provide, based on the set of one or more contextual attributes, a set of proposed responses per each member of a set of proposed causal situations. In some embodiments, the anomalous energy state is at least one of: anomalous energy consumption and anomalous energy production. In some embodiments, the processor may be further configured to perform the step of revising the set of proposed causal situations based on an input designation of a proposed response. In some embodiments, the processor may be further configured to provide, based on the set of one or more contextual attributes, the set of proposed responses per each member of the set of proposed causal situations, via a user interface for input designation. In other embodiments, the processor may be further configured to revise the set of proposed responses of at least one member of the set of proposed causal situations based on an input designation of a proposed response. In another embodiment, the processor may be further configured to provide the set of proposed causal situations in a ranked order based on likelihood estimates per each member of the set of proposed causal situations. In other embodiments, the processor is further configured to apply a weighting factor to at least one member of the set of proposed causal situations, and where the processor is further configured to provide the set of proposed causal situations in a ranked order based on weighted likelihood estimates. Optionally, the weighting factor is based on a frequency of input designation of a proposed response. In other embodiments, the processor is further configured to apply a weighting factor to at least one member of the set of proposed responses, and where the processor is further configured to provide a set of proposed responses in a ranked order based on numerical weight. Optionally, the weighting factor is based on a frequency of input designation of a proposed response. In other embodiments, a detected anomalous energy consumption occurrence is based on a comparison of estimated energy consumption and expected energy consumption based on the set of one or more contextual attributes of the site. Optionally, the processor is further configured to derive the set of one or more contextual attributes from a simulated diurnal-seasonal model of the site.

BRIEF DESCRIPTION OF THE DRAWINGS

Embodiments are illustrated by way of example and not limitation in the figures of the accompanying drawings, and in which.

DETAILED DESCRIPTION

Figure 1:
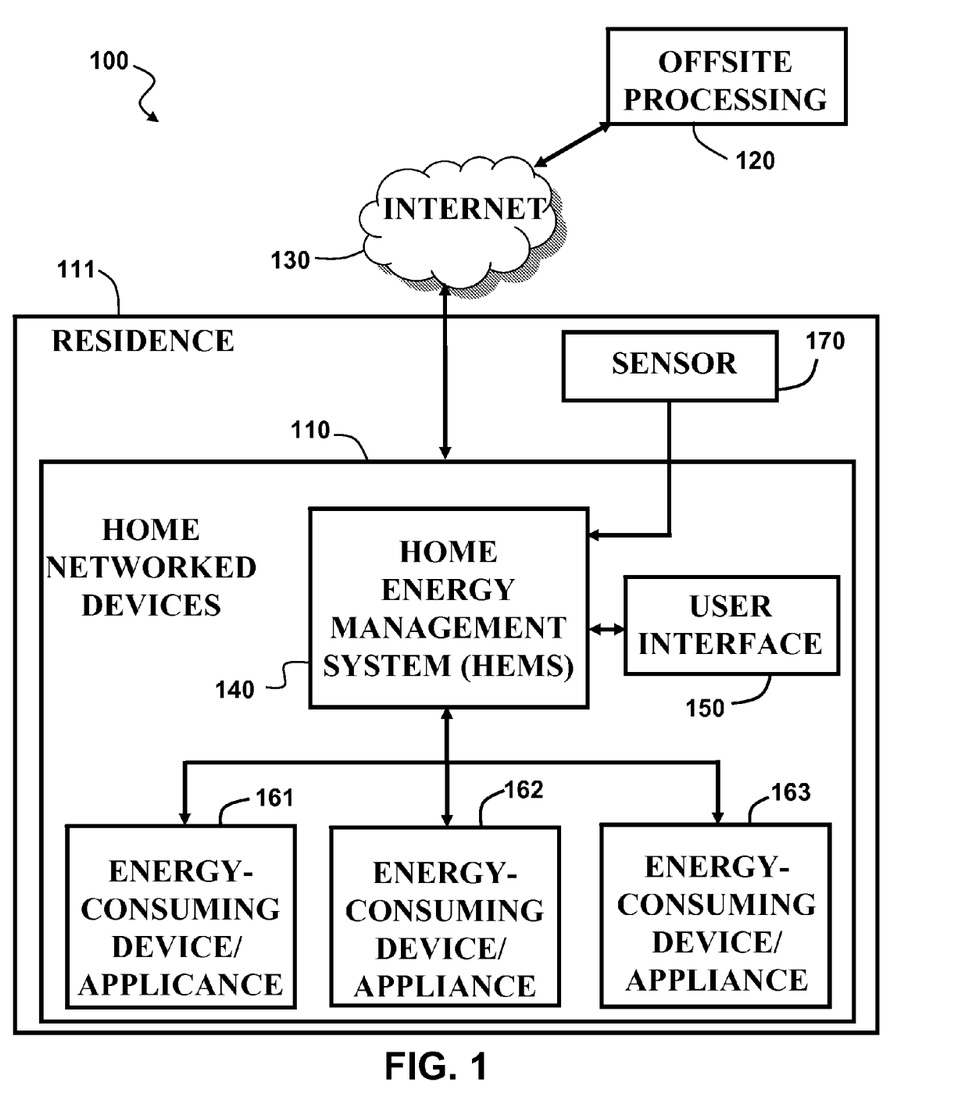
FIG. 1 is a functional block diagram depicting an exemplary system embodiment.

FIG. 1 is a functional block diagram depicting an exemplary system embodiment 100 comprising one or more home networked devices 110 that may be sited within a residence 111 and optionally interconnected with offsite processing 120 via one or more network links, e.g., the Internet 130. An array of home networked devices 110 is depicted in FIG. 1 as including a home energy management system (HEMS) 140, a user interface 150, and one or more energy-consuming devices or appliances 161-163. The home energy management system 140, of the array of home networked devices 110, may monitor the one or more energy-consuming devices or appliances 161-163, and may effect operational changes to one or more energy-consuming devices or appliances 161-163. The home energy management system 140 may monitor one more environmental conditions, such as an air temperature of the residence 111, via a sensor 170, such as an air temperature sensor.

Figure 2:
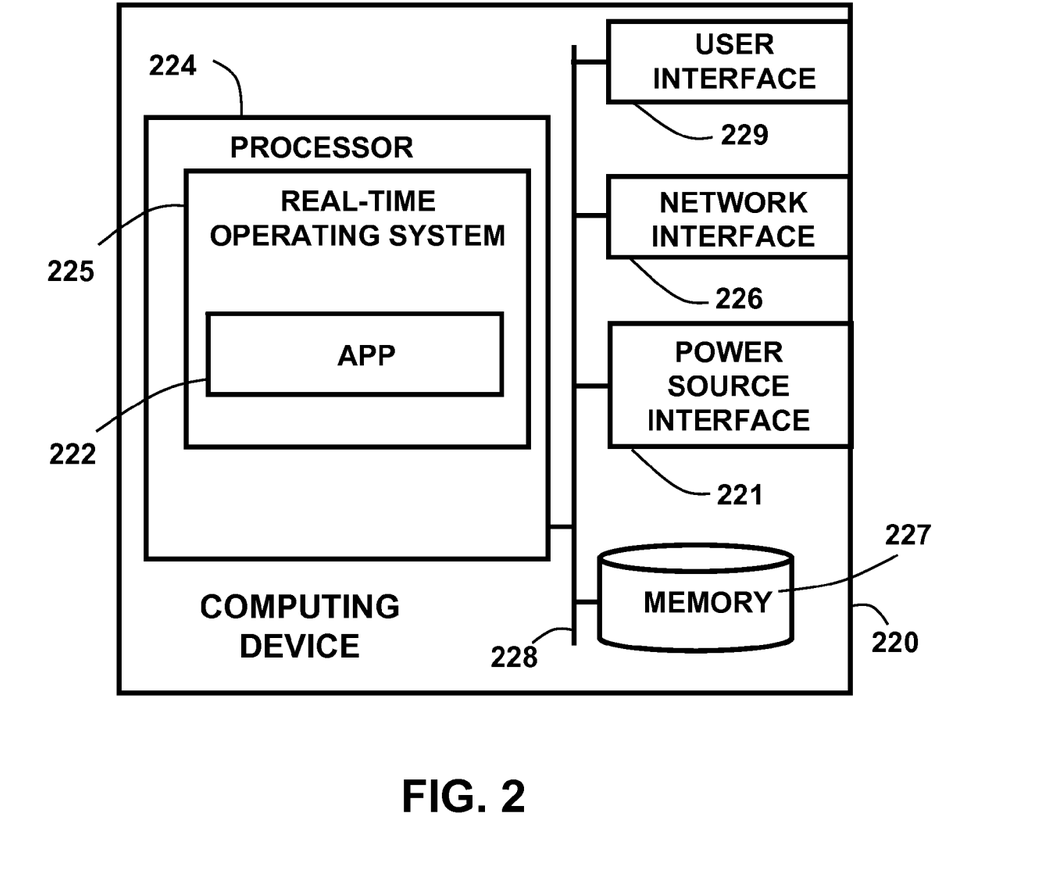
FIG. 2 is a functional block diagram depicting an exemplary computing device embodiment.

The home energy management system 140 may be configured as a computing device. FIG. 2 is a functional block diagram of an exemplary computing device 220 having a processor 224 and memory 227 addressable via a data bus 228. A user interface 229, a power source interface 221, and a network interface 226 by which one or more local devices, and/or internet sites such as an offsite processor, may communicate with the processor 224 via the data bus 228. The processor 224 may be configured to execute programmed steps via a real-time operating system 225 where the steps that comprise the application 222 may include energy consumption measurements that are taken or are estimated, effecting the weighting and ranking of both potential causal situations and associated potential reactions to the causal situations, and generating device control signals and user feedback.

Figure 3:
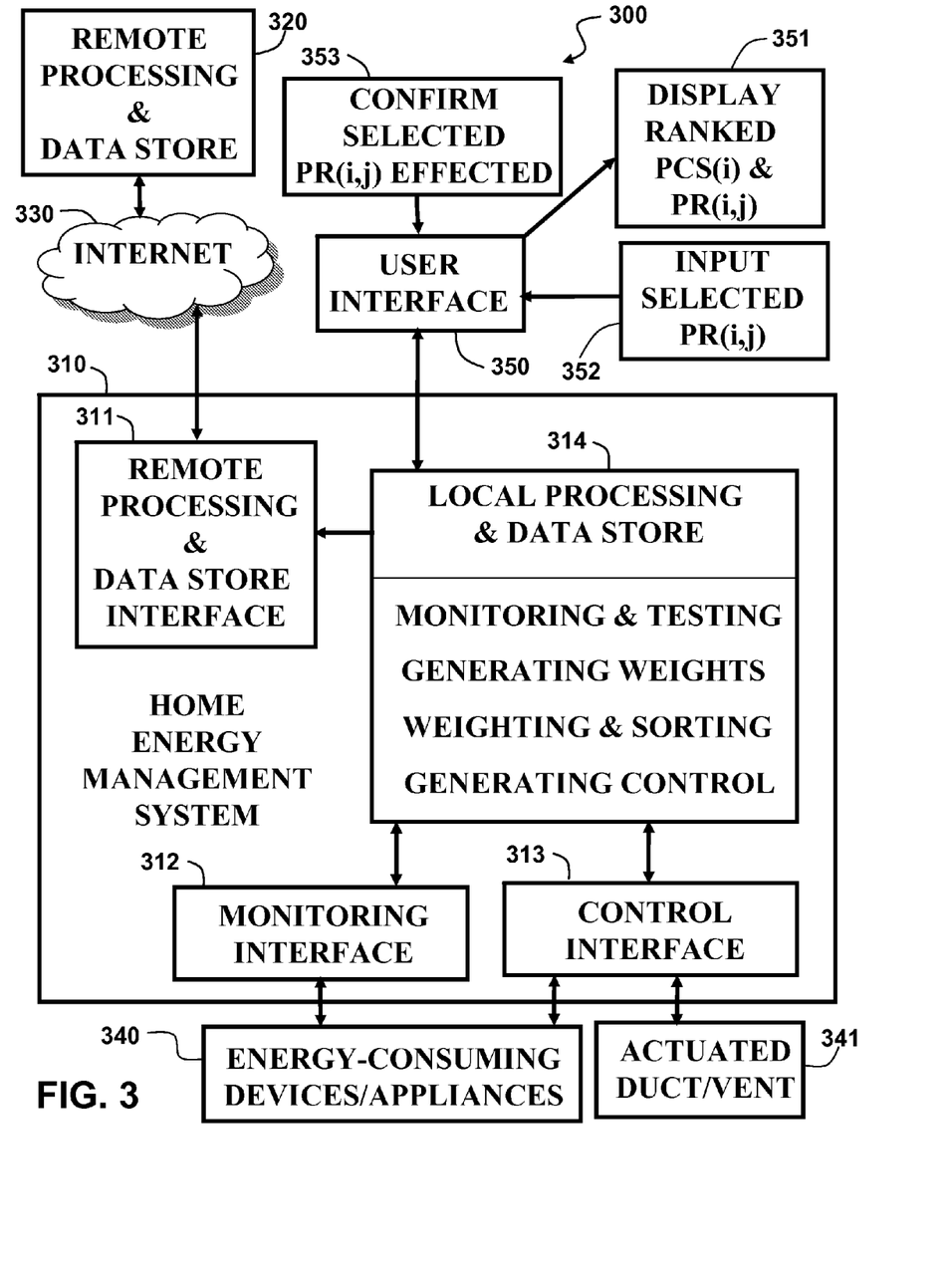
FIG. 3 is a functional block diagram depicting an exemplary system embodiment.

FIG. 3 is a functional block diagram depicting another exemplary system embodiment 300 comprising a home energy management system 310 optionally in communication with remote processing and data store 320 via a network link, e.g., the Internet 330, and via a remote processing and data store interface 311. The home energy management system 310 is depicted as configured to monitor one or more energy-consuming devices or appliances 340 via a monitoring interface 312. The home energy management system 310 is also depicted as configured to control or effect change in one or more energy-consuming devices or appliances 340, or optionally one or more actuated devices, such as actuated ducts or vents 341, via a control interface 313. Via a user interface 350, the system 300 may display 351 ranked potential, likely, or probable causal situations, PCS(i), and for each PCS(i), the system 300 may display 351 a single or more ranked viable, potentially effective, or likely effective reactions PR(i,j) associated with the PCS(i). The user interface 350 is depicted as configured to receive input 352 from a user indicating a selected reaction, i.e., indicating a selected PR(i, j). The user interface 350 is also depicted as configured to receive input 353 from a user indicating a confirmation of the completion of a previously selected reaction, i.e., input indicating a previously selected PR(i,j) was effected. FIG. 3 also depicts the home energy management system 310 as comprising a local processing and data store 314. Via circuitry, a processing unit executing instructions, and/or combinations of both, the local processing 314 may be configured to: (a) monitor the one or more energy-consuming devices; (b) test the measured or estimated energy consumption against one or more thresholds; (c) extract, or request the remote processing and data store 320 extract, potential causal situations, PCS(i), based on the tripped threshold; (d) extract, or request the remote processing and data store 320 extract, potential reactions, PR(i,j), related to the extracted potential causal situations, i.e., related to the PCS(i); (e) apply weights to the potential causal situations, PCS(i), and rank the weighted results; (f) apply weights to the potential reactions, i.e., the PR(i,j), per each PCS(i), and rank the weighted results; (g) output ranked results for display; (h) input user selected PR(i, j); (i) optionally input user confirmation of an action taken relative to a previously selected PR(i,j); and (j) optionally output a control instruction to an energy-consuming device or an actuated device such as a vent or duct.

Accordingly, the resident, or user, may be alerted about a detected anomalous condition. For each anomalous condition alert, the resident may be presented with the list of potential situations extracted from the database. The potential situations may be presented in ranked order. For each potential situation presented, the resident may be presented with a list of countermeasures/corrective actions extracted from the database.

The resident may select any of the presented situations and any of the presented countermeasures/corrective actions. The selections may be recorded into the database at the home energy management system, into the database of the remote processing, or both databases, and may be used by learning algorithms, e.g., frequency counting and correlating processes. Accordingly, the affects of user selections may be applied in future similar situations and affect the ranked displayed situations and actions. That is, to present the list of possible countermeasures/corrective actions, the system may adjust its correlation of likely causal situations and may adjust its correlation of countermeasures/corrective actions to anomalous conditions for a particular residence, and do so based on the user selections as well as based on general knowledge from preloaded heuristics, and learned information from the community.

The system embodiment 300 of FIG. 3 depicts a control interface in communication with both the energy-consuming devices 340 and actuated ducts and vents 341. Accordingly, the countermeasures/corrective actions selected by the user that may be activated by the home energy management system 310 directly may be performed automatically. The countermeasures/corrective actions options selected by the resident that require action on the part of the resident, i.e., those outside of HEMS 310 control, e.g., closing a door, are presented with a query to the resident to confirm the action. This confirmation allows the system to record the positive action. In some embodiments, a timeout function may be invoked to presume the resident performed the action, and then an observed result may be used to weight the probability that the resident did indeed perform the action.

The system records the change in energy use, if any, presumably due to the countermeasures/corrective actions taken. The recorded results may be used by the learning processing. For example, (a) if the action was effective in restoring the system to a normal condition, i.e., within the expected range of energy usage, then the action may be given higher weighting for future rankings; (b) if the action is increasing in frequency of choice by the user, then the action may be given higher weighting for future rankings; and/or (c) if the action is tied to an infrequently selected possible situation, then the correlation of the anomalous condition to the possible situation, be it residential, appliance, or environmental, may be reassessed.

Figure 4:
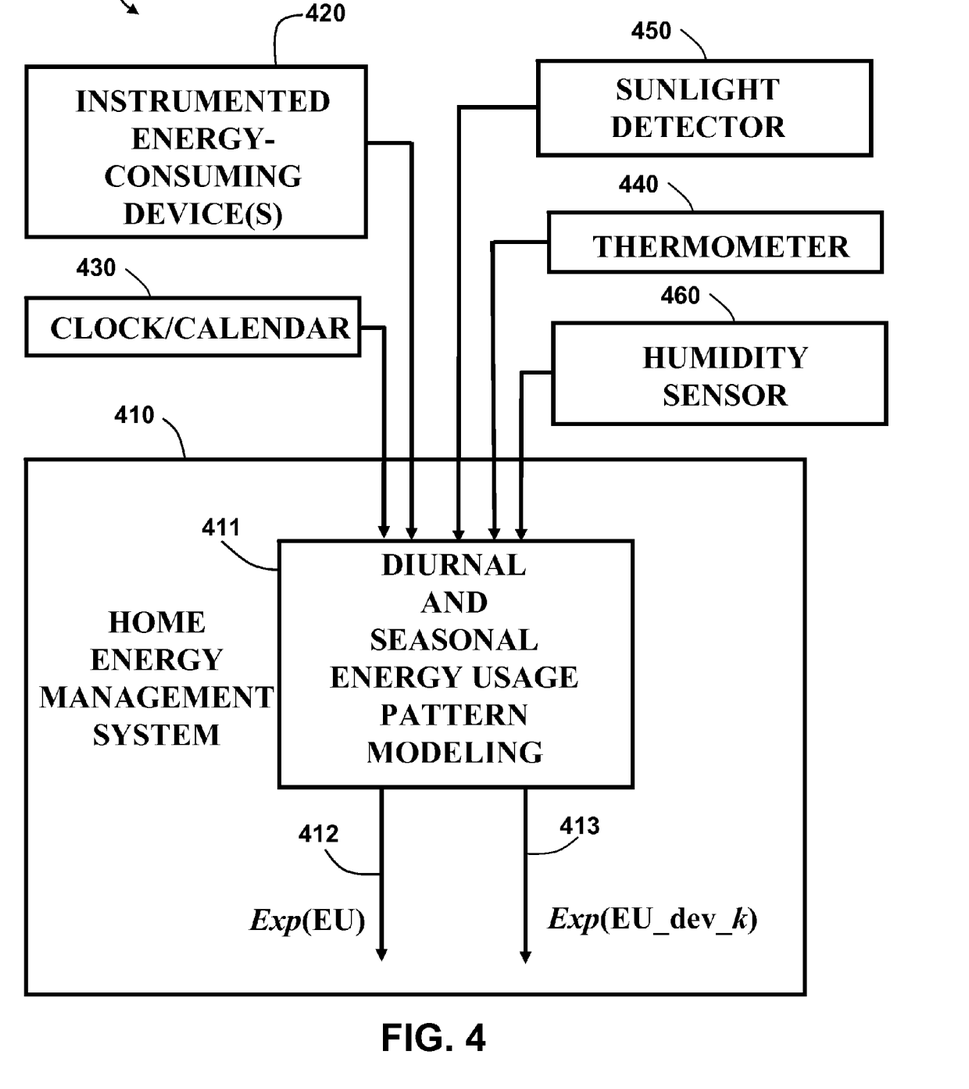
FIG. 4 depicts a functional block diagram of a portion of an exemplary system embodiment.

The system processing of the home energy management system may be configured to draw on the historical data for the residence, or that of a similar home, or predictive energy use data from a computer model of the residence, in order to make a prediction of the expected energy use of the entire residence and each smart appliance. FIG. 4 depicts a functional block diagram of a portion 400 of an exemplary system embodiment. The home energy management system 410 is depicted in FIG. 4 as comprising a diurnal and seasonal energy usage pattern model 411 that adapts to incorporate information received from one or more instrumented energy-consuming devices 420, such as watts consumed over a day, and throughout a year, based on a reference clock/calendar 430. An output of the model 411 is depicted at the expected system home network energy usage 412, i.e., Exp(EU). The model 411 may also adapt to incorporate information from: (a) a thermometer 440, e.g., ambient air temperature; (b) a sunlight detector 450, e.g., one or more photometers positioned to receive solar radiation striking the home or ambient sunlight; and/or (c) a humidity sensor 460, e.g., a capacitive relative humidity sensor that may be proximate to the ambient air temperature sensor. Additional sensors may be disposed in rooms, halls, closets, and ducts. The home area network may comprise k number of instrumented energy-consuming devices. The HEMS may record the activity of all, i.e., k, instrumented devices and appliances of the home area network. Accordingly, the model 411 processing of FIG. 4 is also depicted as providing an estimated/expected energy usage of device(k), i.e., the Exp(EU_dev_k) 413. The data may be cached or stored locally in the HEMS, and then uploaded to remote processing and storage for permanent recording, and for processing that may require higher throughput than the home energy management system and/or for steps that may be executed via non-real time processing. The stored records may include such data as energy usage, time of day, environmental situations, and modes of operation. Static information about the residence, such as configuration, square feet, insulation, and general solar loading, may be recorded in the home energy management system, at the remote processing and storage, or both locations.

The processing of the home energy management system may be configured to test for when the actual energy utilization (EU) is outside a normal/expected range around the computed expected/predicted energy use. If outside the range, the home energy management processing and/or remote processing, collectively the processing, may make reference to a database of potential situations that could account for the statistically anomalous observed condition. Each of the potential situations extracted from the database for some embodiments may be ranked by their associated probability or likelihood of being the actual situation in the residence causing the anomalous condition. The ranking may include: (a) the likelihood this situation occurred in similar residences; and (b) the likelihood this situation occurred for this residence, e.g., based on user confirmed historical occurrences. For each possible causal situation extracted from the database, a list of countermeasures/corrective actions, i.e., candidate remedies or potential reactions, may be extracted from the database. Per each possibly likely causal situation, each countermeasure/corrective action associated with the likely causal situation may be ranked by a weighted multi-attribute function comprising attributes such as: (a) effectiveness of restoring the normal state of the residence; (b) the monetary cost or environmental cost of the action; (c) the difficulty/likelihood of the user performing the action; and (d) the previous experience of the user taking or ignoring this particular countermeasure/corrective action.

Figure 5:
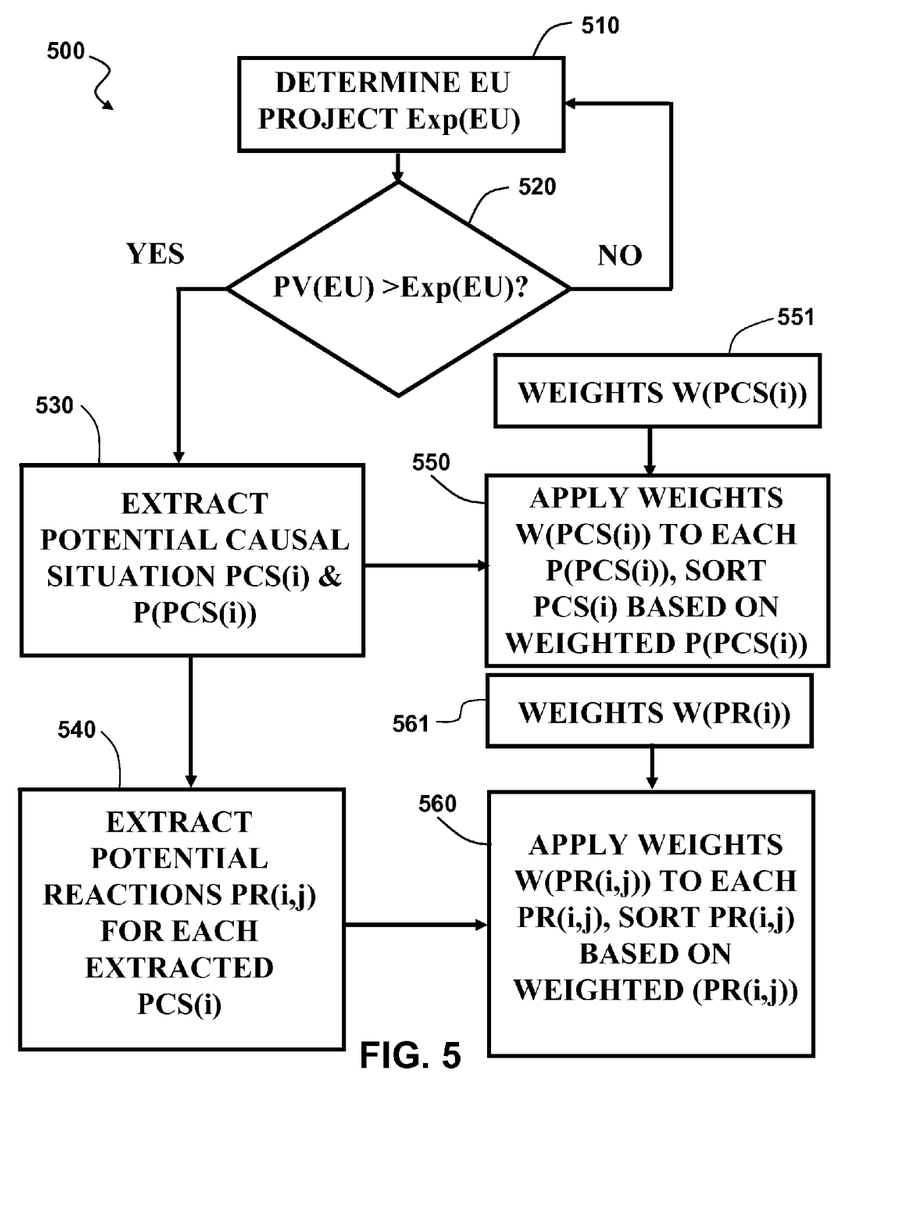
FIG. 5 is a top level flowchart depicting an exemplary process embodiment.

FIG. 5 is a top level flowchart 500 depicting process steps that may be executed by the local processing 314 and/or the remote processing 320 of FIG. 3, collectively the processing. For example, the processing may determine the energy usage level (EU) of devices within the array of home networked devices 110 (FIG. 1), and may estimate or project an expected energy usage level (step 510), e.g., an Exp(EU). The processing may test whether the determined energy usage is outside of a bound or threshold defined by the expected energy usage (test 520), e.g., test whether the present value of the determined, or estimated, energy usage is greater than the expected energy usage, or put another way, is PV(EU)>Exp(EU)? If so, then the processing may extract from a database a set of potential causal situations and the likelihood of each listed causal situation being the actual causal situation (step 530), i.e., the PCS(i) and the p(PCS(i)), and their associated potential reactions (step 540), i.e., PR(i,j). The processing may draw from a set of weights for the potential causal situations 551, i.e., w(PCS(i)), applies the weights to the p(PCS(i)), and sorts/ranks the weighted potential causal situations based on the weighted likelihoods, i.e., the weighted p(PCS(i)) (step 550). The processing draws from a set of weights for the potential reactions 561, i.e., w(PR(i,j)), applies the weights to the PR(i,j), and sorts/ranks the weighted potential reactions (step 560). The values of the weights may be applied based on the resident's, or the user's, profile. The resident profile may be configured by the resident directly or may be learned over time by the system based on the actions selected by the user for similar situations presented previously. So, when a situation in a home occurs that causes a detectable deviation from the normal, expected energy usage, the processing may notify the user, via the user interface, of likely causes and suggested remedies to the deviant energy usage.

For example, when the children of a home leave a bedroom window open on a hot day, a processing embodiment may detect the energy usage deviation of kWh/degree of cooling required to cool the home on a hot afternoon. The processing may draw from its database of likely causes for this deviation, and present the list of possible causes and possible actions, e.g., a window is open: shut the window. Other causes and actions in this example may include; (a) an air filter is choked: (i) clean the air filter or (ii) replace the air filter; (b) a door is open: close the door; and (c) the A/C coolant is low: (i) recharge A/C system with coolant or (ii) repair coolant line.

Figure 6:
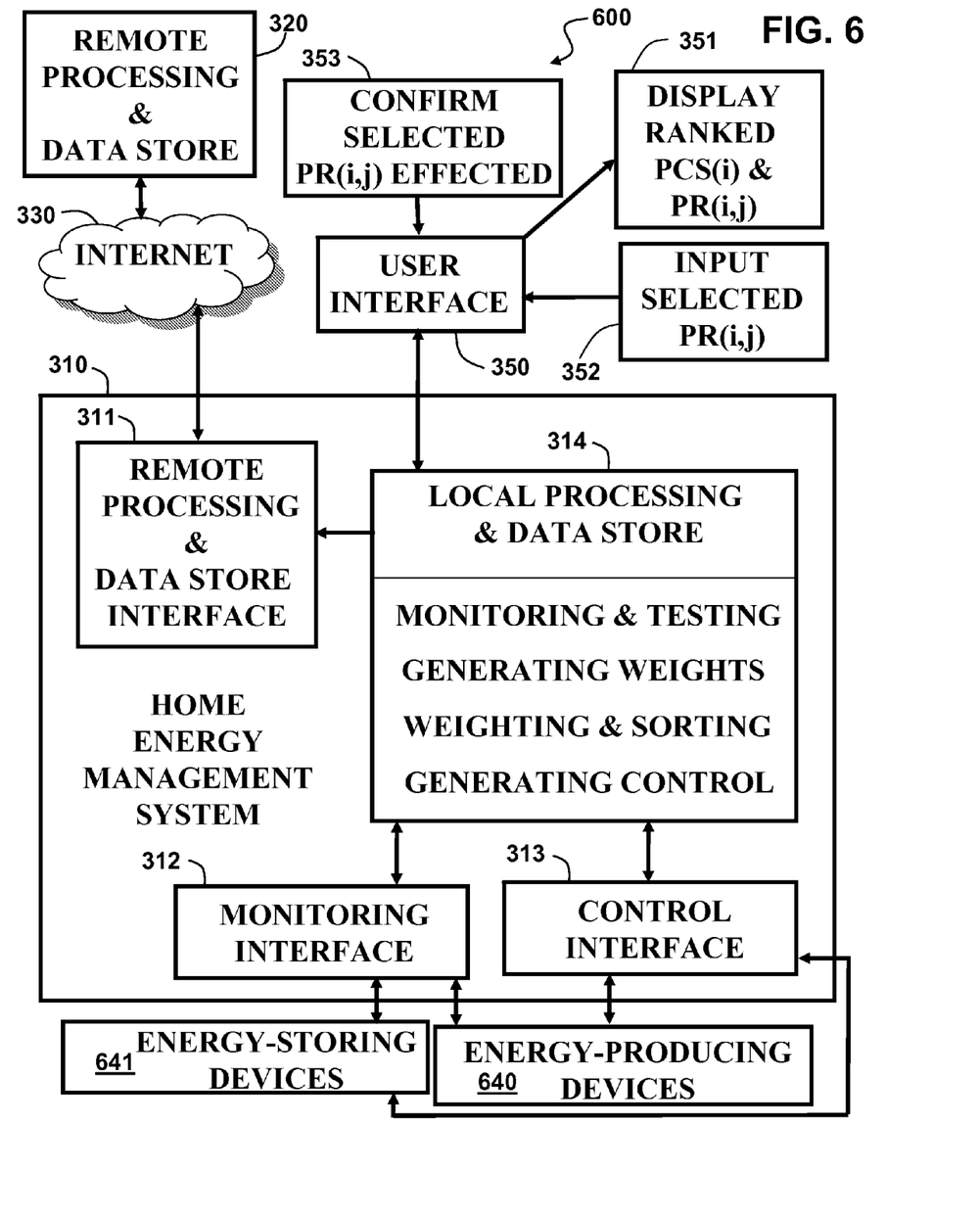
FIG. 6 is a functional block diagram depicting an exemplary system embodiment.

FIG. 6 is a functional block diagram depicting another exemplary system embodiment 600 comprising a home energy management system 310 optionally engaging one or more energy-producing devices 640 such as: one or more residential solar arrays, wind turbines, and/or optionally engaging one or more energy storing devices 641, such as a chemical battery.

The system processing of the home energy management system may be configured to draw on the historical data for the residence, or that of a similar home, or predictive energy generation and/or storage data from a computer model of the residence, in order to make a prediction of the expected energy generation and/or storage of the entire residence and each smart appliance.

Figure 7:
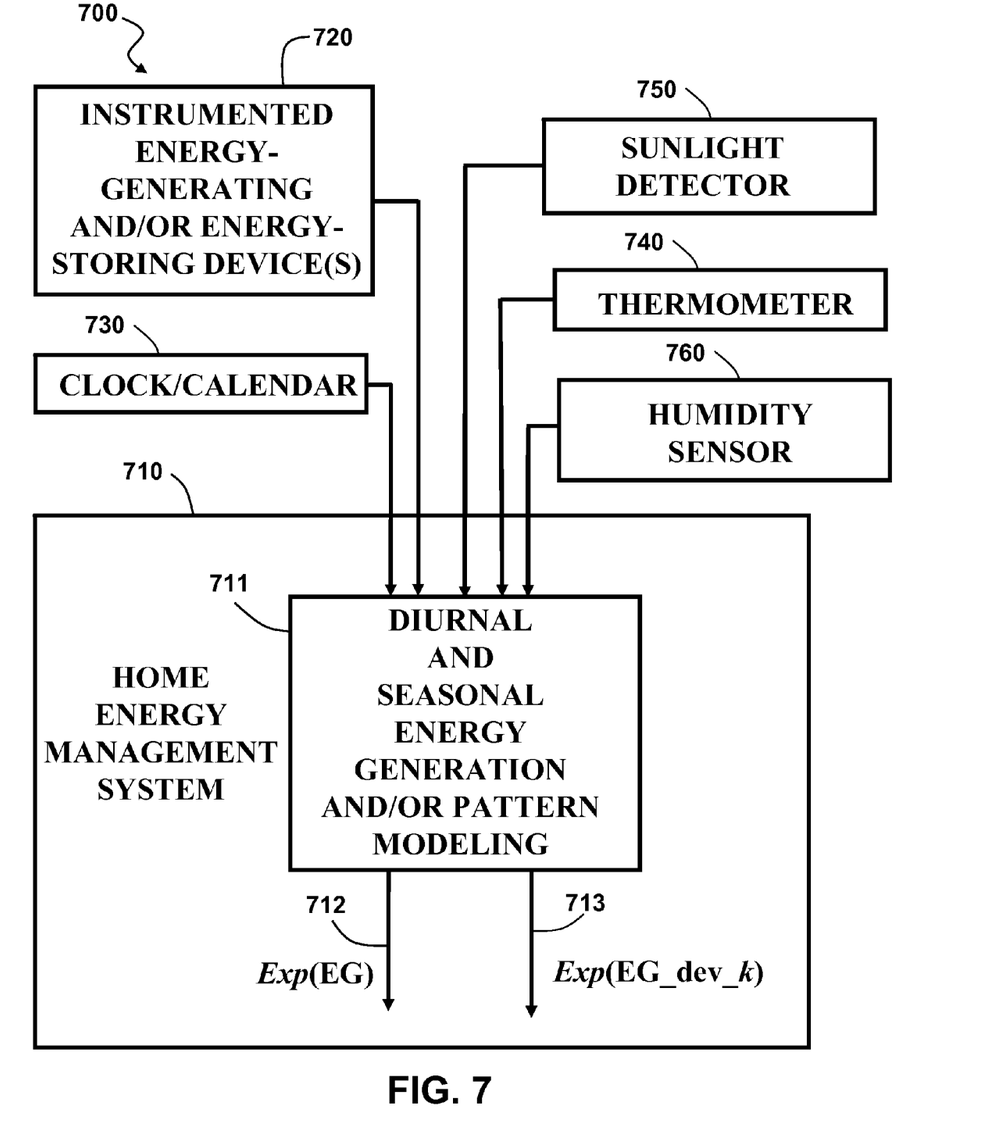
FIG. 7 depicts a functional block diagram of a portion of an exemplary system embodiment.

FIG. 7 depicts a functional block diagram of a portion 700 of an exemplary system embodiment. The home energy management system 710 is depicted as comprising a diurnal and seasonal energy generation and/or energy storage pattern model 711 that adapts to incorporate information received from one or more instrumented energy-generating and/or energy-storing devices 720, such as watts generated over a day, and throughout a year, based on a reference clock/calendar 730. An output of the model 711 is depicted at the expected system home network energy generation 712, i.e., Exp(EG). The model 711 may also adapt to incorporate information from: (a) a thermometer 740, e.g., ambient air temperature; (b) a sunlight detector 750, e.g., one or more photometers positioned to receive solar radiation striking the home or ambient sunlight; and/or (c) a humidity sensor 760, e.g., a capacitive relative humidity sensor that may be proximate to the ambient air temperature sensor. Additional sensors may be disposed in rooms, halls, closets, and ducts. The home area network may comprise k number of instrumented energy-consuming devices. The HEMS may record the activity of all, i.e., k, instrumented devices and appliances of the home area network. Accordingly, the model 711 processing of FIG. 7 is also depicted as providing an estimated/expected energy usage of device(k), i.e., the Exp(EU_dev_k) 713. The data may be cached or stored locally in the HEMS, and uploaded to remote processing and storage for permanent recording, and for processing that may require higher throughput than the home energy management system and/or for steps that may be executed via non-real time processing. The stored records may include such data as energy usage, time of day, environmental situations, and modes of operation. Static information about the residence, such as configuration, square feet, insulation, and general solar loading, may be recorded in the home energy management system, at the remote processing and storage, or both locations.

Figure 8:
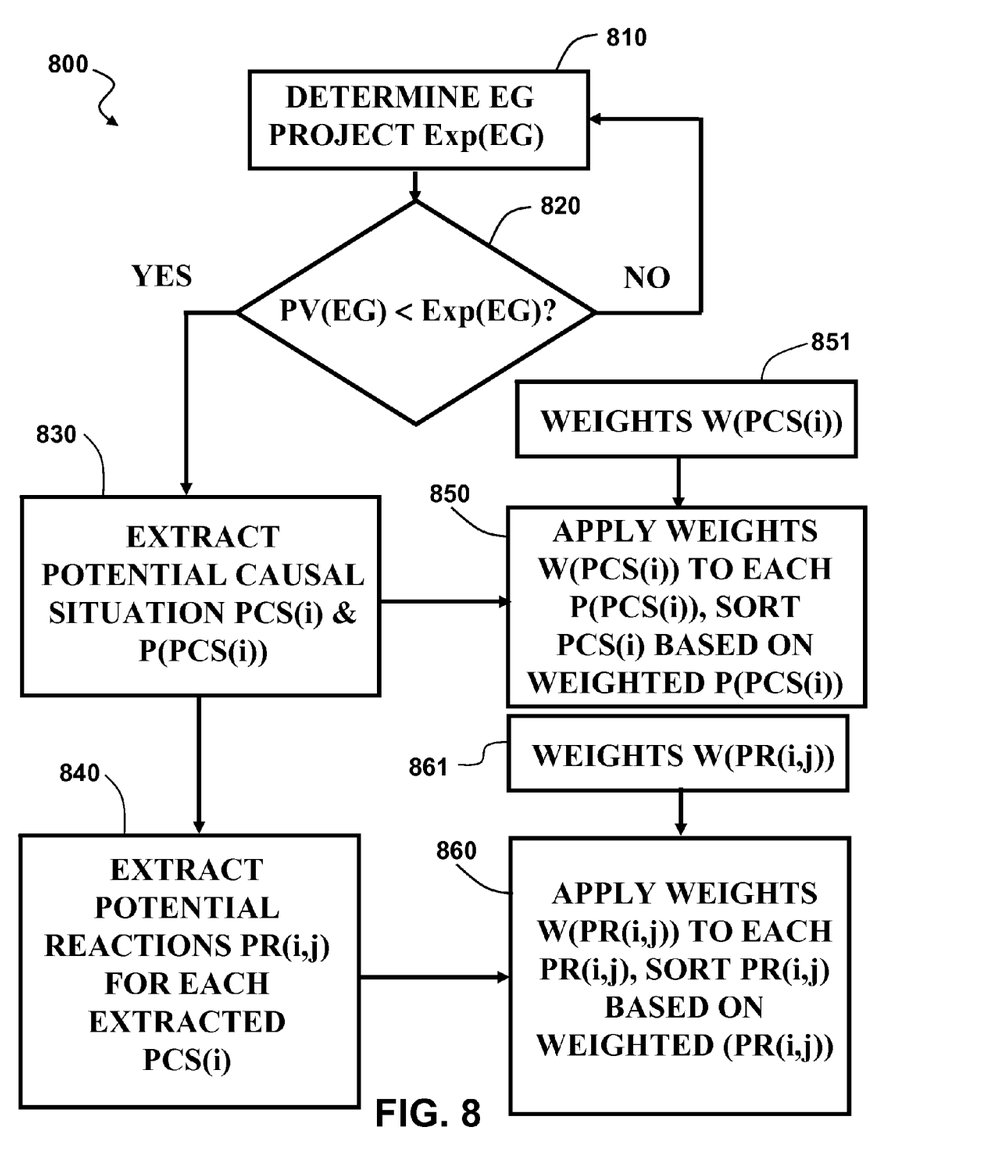
FIG. 8 is a top level flowchart depicting an exemplary process embodiment.

FIG. 8 is a top level flowchart 800 depicting process steps that may be executed by the local processing 314 and/or the remote processing 320 of FIG. 6, collectively the processing. For example, the processing may determine the energy generation level (EG) of energy-producing devices 640 (FIG. 6), and may estimate or project an expected energy production level (step 810), e.g., an Exp(EG). The processing may test whether the determined energy production, and/or storage, is outside of a bound or threshold defined by the expected energy generation (test 820), e.g., test whether the present value of the determined, or estimated, energy generation and/or energy storage is less than the expected energy production and/or storage, or put another way, is PV(EG)<Exp(EG)? If so, then the processing extracts from a database a set of potential causal situations and the likelihood of each listed causal situation being the actual causal situation (step 830), i.e., the PCS(i) and the p(PCS(i)), and their associated potential reactions (step 840), i.e., PR(i,j). The processing may draw from a set of weights for the potential causal situations 851, i.e., w(PCS(i)), applies the weights to the p(PCS(i)), and sorts/ranks the weighted potential causal situations based on the weighted likelihoods, i.e., the weighted p(PCS(i)) (step 850). The processing may draw from a set of weights for the potential reactions 861, i.e., w(PR(i,j)), applies the weights to the PR(i,j), and sorts/ranks the weighted potential reactions (step 860). The values of the weights may be applied based on the resident's, or the user's profile. The resident profile may be configured by the resident directly or may be learned over time by the system based on the actions selected by the user for similar situations presented previously. So, when a situation in a home occurs that causes a detectable deviation from the normal, expected energy production/generation and/or energy storage, the processing can notify the user, via the user interface, of likely causes and suggested remedies to the deviant energy production/generation.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples should not be limited by the particular disclosed embodiments described above.

What is claimed is:

1. A method of energy management at a site comprising:
associating, by a computing device, based on a list of potential situations extracted from a data store, a detected anomalous energy state occurrence with a set of one or more contextual attributes of the site;
determining, by the computing device, a set of proposed responses per each member of a set of proposed causal situations, the determination based on a likelihood that a causal situation occurred in similar sites and a likelihood that a causal situation occurred for the site based on confirmed historical occurrences; wherein the set of proposed responses is a countermeasure to the causal situation associated with a corrective action and the set of proposed responses is determined to be effective after a timeout function is invoked; and
providing, based on the set of one or more contextual attributes, the set of proposed responses per each member of a set of proposed causal situations.

2. The method of claim 1 further comprising: revising the set of proposed causal situations based on an input designation of a proposed response.

3. The method of claim 1 wherein in the step of providing, based on the set of one or more contextual attributes, the set of proposed responses per each member of the set of proposed causal situations is provided via a user interface for input designation.

4. The method of claim 1 further comprising: revising the set of proposed responses of at least one member of the set of proposed causal situations based on an input designation of a proposed response.

5. The method of claim 1 wherein the set of proposed causal situations is provided in a ranked order based on likelihood estimates per each member of the set of proposed causal situations.

6. The method of claim 1 further comprising applying a weighting factor to at least one member of the set of proposed causal situations, and wherein the set of proposed causal situations is provided in a ranked order based on weighted likelihood estimates.

7. The method of claim 6 wherein the weighting factor is based on a frequency of input designation of a proposed response.

8. The method of claim 1 further comprising applying a weighting factor to at least one member of the set of proposed responses, and wherein the set of proposed responses is provided in a ranked order based on numerical weight.

9. The method of claim 8 wherein the weighting factor is based on a frequency of input designation of a proposed response.

10. The method of claim 1 wherein a detected anomalous energy consumption occurrence is based on a comparison of estimated energy consumption and expected energy consumption based on the set of one or more contextual attributes of the site.

11. The method of claim 10 wherein the set of one or more contextual attributes are derived from a simulated diurnal-seasonal model of the site.

12. A device for energy management at a site, the device comprising:

a processor, and addressable memory, the addressable memory comprising a set of one or more contextual attributes of the site, wherein the processor is configured to:

associate a detected anomalous energy state occurrence with the set of one or more contextual attributes of the site, based on a list of potential situations extracted from a data store;

determine a set of proposed responses per each member of a set of proposed causal situations, the determination based on a likelihood that a causal situation occurred in similar sites and a likelihood that a causal situation occurred for the site based on confirmed historical occurrences; wherein the set of proposed responses is a countermeasure to the causal situation associated with a corrective action and the set of proposed responses is determined to be effective after a timeout function is invoked; and provide, based on the set of one or more contextual attributes, the set of proposed responses per each member of a set of proposed causal situations.

13. The device of claim 12 wherein the processor is further configured to revise the set of proposed causal situations based on an input designation of a proposed response.

14. The device of claim 12 wherein the processor is further configured to provide, based on the set of one or more contextual attributes, the set of proposed responses per each member of the set of proposed causal situations, via a user interface for input designation.

15. The device of claim 12 wherein the processor is further configured to revise the set of proposed responses of at least one member of the set of proposed causal situations based on an input designation of a proposed response.

16. The device of claim 12 wherein the processor is further configured to provide the set of proposed causal situations in a ranked order based on likelihood estimates per each member of the set of proposed causal situations.

17. The device of claim 12 wherein the processor is further configured to apply a weighting factor to at least one member of the set of proposed causal situations, and wherein the processor is further configured to provide the set of proposed causal situations in a ranked order based on weighted likelihood estimates.

18. The device of claim 17 wherein the weighting factor is based on a frequency of input designation of a proposed response.

19. The device of claim 18 wherein the processor is further configured to apply a weighting factor to at least one member of the set of proposed responses, and wherein the processor is further configured to provide a set of proposed responses in a ranked order based on numerical weight.

20. The device of claim 19 wherein the weighting factor is based on a frequency of input designation of a proposed response.

21. The device of claim 12 wherein a detected anomalous energy consumption occurrence is based on a comparison of estimated energy consumption and expected energy consumption based on the set of one or more contextual attributes of the site.

22. The device of claim 21 wherein the processor is further configured to derive the set of one or more contextual attributes from a simulated diurnal-seasonal model of the site.

23. The method of claim 1 wherein the determining of the set of proposed responses is based on at least one of: a set of user selections, general knowledge based on preloaded heuristics, and information obtained from a plurality of other sites.

24. The method of claim 6 wherein the weighting factor comprises a set of one or more attributes, wherein the set of one or more attributes are determined based on at least one of: (a) an effectiveness of restoring the normal state of the site; (b) a monetary cost or an environmental cost of a proposed response; (c) a likelihood of a user performing the proposed response; and (d) a previous experience of the user taking or ignoring the proposed response.

* * * * *